(12) United States Patent
Welter et al.

(10) Patent No.: US 11,441,019 B2
(45) Date of Patent: Sep. 13, 2022

(54) PLY COAT RUBBER COMPOSITION AND A TIRE COMPRISING A PLY COAT RUBBER COMPOSITION

(71) Applicant: THE GOODYEAR TIRE & RUBBER COMPANY, Akron, OH (US)

(72) Inventors: Carolin Anna Welter, Schleich (DE); Jean-Claude Knepper, Ingeldorf (LU); Marc-André Paulus, Rodershausen (LU); Betul Buehler, Cuyahoga Falls, OH (US); Dawn Michelle Johnson, Uniontown, OH (US); Philippe Schmit, Chantemelle (BE); Vaibhav Nawale, Lorentzweiler (LU)

(73) Assignee: THE GOODYEAR TIRE & RUBBER COMPANY

( * ) Notice: Subject to any disclaimer, the term of this patent is extended or adjusted under 35 U.S.C. 154(b) by 182 days.

(21) Appl. No.: 16/904,034

(22) Filed: Jun. 17, 2020

(65) Prior Publication Data

US 2020/0399449 A1    Dec. 24, 2020

Related U.S. Application Data

(60) Provisional application No. 62/864,618, filed on Jun. 21, 2019.

(51) Int. Cl.
| | | |
|---|---|---|
| *C08L 7/00* | (2006.01) | |
| *B60C 9/00* | (2006.01) | |
| *C08L 9/00* | (2006.01) | |
| *B60C 1/00* | (2006.01) | |
| *B60C 9/20* | (2006.01) | |

(52) U.S. Cl.
CPC ............ *C08L 7/00* (2013.01); *B60C 1/0041* (2013.01); *B60C 9/0007* (2013.01); *B60C 9/2009* (2013.01); *C08L 9/00* (2013.01); *B60C 2001/0066* (2013.01); *B60C 2001/0083* (2013.01); *B60C 2009/0021* (2013.01); *C08L 2205/03* (2013.01)

(58) Field of Classification Search
CPC ...... B29D 30/40; B29D 30/38; B60C 1/0041; B60C 9/2009; B60C 9/0007; B60C 2001/0066; B60C 2001/0083; B60C 2009/0021; C09D 107/00; C08L 7/00; C08L 9/00; C08L 2205/03
See application file for complete search history.

(56) References Cited

U.S. PATENT DOCUMENTS

| | | | |
|---|---|---|---|
| 7,514,494 B2 | 4/2009 | Lechtenboehmer et al. | |
| 8,415,426 B1 | 4/2013 | Hua et al. | |
| 8,772,374 B2 | 7/2014 | Agostini et al. | |
| 9,133,281 B2 | 9/2015 | Kaszas | |
| 2007/0142518 A1* | 6/2007 | Hsu | C08K 9/06 523/213 |
| 2009/0151838 A1 | 6/2009 | Sandstrom et al. | |
| 2011/0136969 A1 | 6/2011 | Hahn et al. | |
| 2013/0096260 A1 | 4/2013 | Hahn et al. | |
| 2016/0272792 A1* | 9/2016 | Miyazaki | C08L 1/02 |
| 2017/0361658 A1* | 12/2017 | Sanders | B60C 11/04 |
| 2020/0070579 A1 | 3/2020 | Tahon et al. | |
| 2020/0399448 A1* | 12/2020 | Tahon | B60C 1/00 |

FOREIGN PATENT DOCUMENTS

| | | |
|---|---|---|
| EP | 1191057 B1 | 12/2004 |
| EP | 1712587 B1 | 5/2008 |
| EP | 1726617 B1 | 5/2008 |
| EP | 2033811 B1 | 9/2010 |

* cited by examiner

*Primary Examiner* — Angela C Scott
(74) *Attorney, Agent, or Firm* — Alvin T. Rockhill

(57) ABSTRACT

In accordance with the invention, a ply coat rubber composition for a tire ply comprises from 60 phr to 90 phr of natural rubber, from 10 phr to 40 phr of synthetic polyisoprene, from 30 phr to 80 phr of pre-silanized and precipitated silica, from 0.1 phr to 5 phr of a cobalt salt, up to 15 phr of carbon black, up to 5 phr of resin, and up to 8 phr of oil. Moreover, the invention is directed to a tire comprising such a rubber composition.

20 Claims, 1 Drawing Sheet

PLY COAT RUBBER COMPOSITION AND A TIRE COMPRISING A PLY COAT RUBBER COMPOSITION

This application claims benefit of U.S. Provisional Patent Application Ser. No. 62/864,618, filed on Jun. 21, 2019. The teachings of U.S. Provisional Patent Application Ser. No. 62/864,618 are incorporated herein by reference in their entirety.

FIELD OF THE INVENTION

The present invention is directed to a rubber composition for use in a tire, in particular, a ply coat rubber composition. Moreover, the present invention includes a tire comprising such a composition. A ply in accordance with the invention may be one or more of a tire carcass ply, a tire belt ply, a tire overlay ply or a ply strip.

BACKGROUND

While tire performance has significantly improved over decades and the use of silica in tire compounds has resulted in improvements in tire rolling resistance, there is still significant room for improvement. In an effort to further reduce vehicle emissions, there is a desire to further reduce rolling resistance of tires for multiple applications. Such a reduction can be of particular interest for tires of trucks transporting heavy loads at relatively constant speed over large distances.

An example of a ply coat composition is disclosed in United States Patent Publication No. 2009/0151838 A1. The composition disclosed therein is essentially based on natural rubber and a silica filler. In order to improve the coupling of the silica filler to the rubber matrix, a coupling agent is added during the mixing process. However, addition of such coupling agents typically results in a more complex and potentially longer mixing process. Moreover, said composition comprises a resin system comprising two components in the form of a methylene donor and a methylene acceptor. While the addition of such a resin system may result in improved stiffness and/or adhesion properties, it also has some disadvantages as for instance in terms of environment, safety and health or may also result in a more complex mixing process. While said prior art composition may have some advantages over earlier prior art, there is still room for improvement left.

SUMMARY OF THE INVENTION

A first object of the invention may be to provide rubber compositions that allow building tires or tire components, in particular tire plies, supporting a reduced rolling resistance of the tire.

Another object of the invention may be to provide a rubber composition with relatively high rebound and/or limited hysteresis properties.

Another object of the invention may be to provide improved ply coat compositions, in particular for truck tires which may comprise metal reinforcing material, such as steel wires. This could be carcass plies, belt plies or overlay plies.

In one aspect of the invention, a rubber composition for a ply coat is provided, comprising from 60 phr to 100 phr of natural rubber, from 0 phr to 40 phr of synthetic polyisoprene, from 30 phr to 80 phr of pre-silanized precipitated silica, up to 15 phr of carbon black, up to 5 phr of a resin and up to 8 phr of an oil.

In particular, the use of pre-silanized (pretreated and/or pre-hydrophobated) precipitated silica or in other words chemically pre-treated silica (CTS) in the composition of the invention is an important aspect. While the use of silica or HDS silica has been known for a long time in combination with separate coupling agents introduced into the rubber composition during the mixing stage, the pre-silanized silica in accordance with the present invention has been pre-silanized with a silane and is added as pre-silanized substance into the rubber composition, respectively the mixing process, in other words as an educt or reactant. Silanizing the silica ensures a better compatibility with the rubber matrix.

In an embodiment, the composition comprises one or more of the following ranges: from 60 phr 90 phr of natural rubber, from 10 to 40 phr of synthetic polyisoprene, from 30 phr to 80 phr of pre-silanized precipitated silica, up to 15 phr of carbon black, up to 5 phr of resin, and up to 8 phr of oil. While full natural rubber compounds may have an improved tear strength or desirable strain crystallization, the synthetic polyisoprene may for instance improve the tack of the rubber material. It can also be desirable to use synthetic polyisoprene for cost reasons. However, use of pure synthetic polyisoprene rubber compositions is not desirable.

In an embodiment, the composition comprises one or more of further limited ranges: from 70 phr to 80 phr of natural rubber, from 20 phr to 30 phr of synthetic polyisoprene, and/or from 50 phr to 60 phr of pre-silanized precipitated silica and/or from 2 phr to 10 phr of carbon black and/or less than 5 phr of a resin and/or less than 8 phr of oil.

In another embodiment, the rubber composition comprises from 0 phr to 5 phr of a cobalt salt, preferably from 0.1 phr to 5 phr of cobalt salt, and most preferably from 0.2 phr to 2 phr of cobalt salt. This content may be of particular interest if used in ply coating compounds as it may, amongst others, improve the adhesion of the rubber coating to the ply material, in particular if such material is metal, e.g. brass coated metal as for instance steel. In another embodiment, the rubber composition may be essentially cobalt free, or in other words comprise less than 0.1 phr of cobalt salt. The cobalt compound will typically be a cobalt salt of a fatty acid or a cobalt salt of an aliphatic or alicyclic carboxylic acid containing from 6 to 30 carbon atoms. Some representative examples of cobalt compounds which may be used include the cobalt salts, cobalt naphthanate, cobalt linoleate, cobalt stearate, cobalt oleate, cobalt acetate, cobalt neodecanoate, cobalt tallate, cobalt resinate, cobalt acetonate, or in situ salts prepared from cobalt hydroxide and an organic acid such as naphthenic acid, stearic acid, oleic acid, acetic acid, linoleic acid and the like. Additional cobalt compounds which may be used are known under the tradename Manoband™ C. Manoband™ C is a cobalt complex of an organic acid containing boron manufactured by Manchem Company. Manoband™ C is described in British Patent No. 972,804, which is incorporated by reference in its entirety.

In another embodiment, the rubber composition comprises from 1 phr to 20 phr of zinc oxide, optionally from 5 phr to 15 phr of zinc oxide. These relatively large amounts of zinc oxide may help to improve adhesion between metal wire and the coating rubber compound upon sulfur curing.

In yet another embodiment, the composition comprises from 1 phr to 15 phr of sulfur, optionally from 4 phr to 10 phr of sulfur. It has been found that these ranges offer a preferable sulfur amount for curing purposes. In particular, such relatively high sulfur amounts can be advantageous when using no or small amounts of resin with regards to the adhesion of the coating to the ply reinforcement material, in particular when using brass coated metal wires.

In accordance with another embodiment, the rubber composition is essentially resin free. This is a benefit because resins can constitute potential threats to environment, health and safety during mixing and/or tire manufacturing. Thus, identifying compositions with good adhesion and/or stiffness properties but avoiding resins is of interest. In particular, the amount of resin in the composition may be less than 2 phr.

In yet another embodiment of the invention, the composition comprises from 1 phr to 10 phr of antidegradants such as anti-ozonants and/or anti-oxidants. Optionally, the amounts of such material may be from 1 phr to 5 phr. Antidegradants as such are known in the prior art for protecting the tire against oxidation and ozonation.

In another embodiment, the rubber composition comprises from 0.1 phr to 5 phr of an accelerator, optionally from 1 phr to 4 phr of an accelerator. Accelerators as such are known in the prior art.

In a further embodiment, the pre-silanized precipitated silica is silanized with a sulfur-containing silane. The presence of sulfur in the silane, e.g. in the form of mercapto groups or sulfidic groups, improves as well the connection of the pre-silanized silica to the rubber matrix after curing and adhesion.

In a further embodiment, the chemically pre-silanized and precipitated silica has a CTAB adsorption surface area of between 120 and 210 $m^2/g$, optionally between 130 $m^2/g$ and 150 $m^2/g$ and/or between 190 $m^2/g$ and 210 $m^2/g$, or even between 195 $m^2/g$ and 205 $m^2/g$. The CTAB (cetyl trimethyl ammonium bromide) method for determination of the silica surface area (ASTM D6845) is known to the person skilled in the art.

In still another embodiment, said pre-silanized precipitated silica is precipitated silica pre-reacted with either a silica coupler/silane, as for instance a sulfur-containing silane, which may be bis(3-triethoxysilylpropyl)polysulfide containing an average of from 1 to 5 connecting sulfur atoms (preferably 2 to 4) in its polysulfidic bridge or an alkoxyorganomercaptosilane.

The reaction with a mercaptosilane, with its SH groups, may improve compatibility of the silica with the rubber material or rubber matrix and/or support the curing process.

The amount of mercapto (—SH) groups on the surface of the silica may be in the range of between 0.1 weight percent and 1 weight percent, optionally 0.4 weight percent to 1 weight percent, or 0.4 weight percent to 0.6 weight percent.

In addition or alternatively to the mercapto groups coupled to the silica, the pre-silanized precipitated silica may comprise a compatibilizer which is typically a carbon chain or hydrocarbon material having multiple carbon atoms (for instance at least 4 carbon atoms) along its chain. Such a compatibilizer may facilitate the mixing of the composition. In an example, the weight percent of carbon surface load/functionalization is between 2 and 10, or optionally between 3 and 8.

In another embodiment, said pre-silanized precipitated silica is pre-hydrophobated. This may be a result of above described pretreatment and/or said added hydrocarbon chain material.

In yet another embodiment, the composition further comprises a (separate/additional) silica coupling agent (silica coupler/silane), wherein the ratio (in phr) of said pre-silanized precipitated silica to the silica coupling agent is between 5:1 and 30:1, preferably between 10:1 and 25:1. It has been found that additional provision of (free) silane also has advantages for the adhesion of the rubber composition to the wire (without the need of an additional mixing step).

Said separate silica coupler (added to said rubber composition) may have a moiety reactive with hydroxyl groups (e.g. silanol groups) on said pre-silanized precipitated silica and/or another different moiety interactive with said natural rubber and/or synthetic polyisoprene.

In another embodiment, the rubber composition is exclusive of the addition of precipitated silica to the rubber composition (thereby exclusive of addition of non-pre-silanized precipitated silica). For instance, the composition comprises less than 10 phr of added precipitated silica or alternatively less than 5 phr of added precipitated silica.

In one embodiment, where said rubber composition contains added precipitated silica (in addition to said pre-silanized precipitated silica), said rubber composition may contain also added silica coupler (silica coupler added to said rubber composition), where said silica coupler has a moiety reactive with hydroxyl groups (e.g. silanol groups) on said precipitated silica and said pre-silanized precipitated silica and another different moiety interactive with said natural rubber and/or synthetic polyisoprene.

In one embodiment, said silica coupler added to said rubber composition is comprised of bis(3-triethoxysilylpropyl) polysulfide having an average of from about 2 to about 4 connecting sulfur atoms in its polysulfidic bridge.

The added precipitated silica may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the Journal of the American Chemical Society, Volume 60, as well as ASTM D3037.

Such added precipitated silicas may, for example, also be characterized by having a dibutylphthalate (DBP) absorption value, for example, in a range of about 100 cc/100 g to about 400 cc/100 g, and more usually about 150 cc/100 g to about 300 cc/100 g.

The pre-hydrophobated precipitated silica utilized in accordance with this invention is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731, the teachings of which are incorporated herein for the purpose of describing pre-hydrophobated precipitated silica and techniques for making such pre-hydrophobated precipitated silica.

The prehydrophobated precipitated silica may optionally be treated with a silica dispersing aid. Such silica dispersing aids may include glycols, such as fatty acids, diethylene glycols, polyethylene glycols, fatty acid esters of hydrogenated or non-hydrogenated $C_5$ or $C_6$ sugars, and polyoxyethylene derivatives of fatty acid esters of hydrogenated or non-hydrogenated $C_5$ or $C_6$ sugars. Exemplary fatty acids include stearic acid, palmitic acid and oleic acid. Exemplary fatty acid esters of hydrogenated and non-hydrogenated $C_5$ and $C_6$ sugars (e.g., sorbose, mannose, and arabinose)

include, but are not limited to, the sorbitan oleates, such as sorbitan monooleate, dioleate, trioleate and sesquioleate, as well as sorbitan esters of laurate, palmitate and stearate fatty acids. Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups.

The optional silica dispersing aids, if used, are present in an amount ranging from about 0.1% to about 25% by weight based on the weight of the silica, with about 0.5% to about 20% by weight being suitable, and about 1% to about 15% by weight based on the weight of the silica also being suitable. Various pre-treated precipitated silicas are described in U.S. Pat. Nos. 4,704,414, 6,123,762 and 6,573,324. The teachings of U.S. Pat. Nos. 4,704,414, 6,123,762 and 6,573,324 are incorporated herein by reference.

In any case, the pre-hydrophobated precipitated silica is pre-hydrophobated by treating silica in an aqueous colloidal form thereof with both an organomercaptosilane and an alkylsilane in a weight ratio of said organomercaptosilane to said alkylsilane in a range of from 10/90 to 90/10; wherein said alkylsilane is of the general Formula (I):

$$X_n\text{—Si—}R_{4-n} \quad (I),$$

wherein R is an alkyl radical having from 1 to 18 carbon atoms, preferably from 1 to 8, carbon atoms, such as, methyl, ethyl, isopropyl, n-butyl and octadecyl radicals, n is a numeral from 1 to 3 and X is a radical selected from halogens, namely chlorine or bromine, preferably a chlorine radical, and alkoxy radicals, preferably an alkoxy radical as $(R^1O)$—, wherein $R^1$ is an alkyl radical having from 1 to 3 carbon atoms, such as, methyl, ethyl and isopropyl radicals, preferably from methyl and ethyl radicals, and where said organomercaptosilane is of the general formula (II):

$$(X)_n(R^2O)_{3-n}\text{—Si—}R^3\text{—SH} \quad (II),$$

wherein X is a radical selected from halogens, such as chlorine or bromine, preferably a chlorine radical, and alkyl radicals having from 1 to 16 carbon atoms, preferably selected from methyl, ethyl, n-propyl, and n-butyl radicals; wherein $R^2$ is an alkyl radical having from 1 to 16 carbon atom, preferably from 1 to 4 carbon atoms, preferably selected from methyl and ethyl radicals and $R^3$ is an alkylene radical having from 1 to 16 carbon atoms, preferably from 1 to 4 carbon atoms, preferably a propylene radical; wherein n represents an integer from 0 to 3 with n preferably representing zero.

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative organomercaptosilanes of Formula (II) are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries. Some representative examples of preferred pre-silanized precipitated silicas with a silica coupler include Agilon® 400, Agilon® 454 and Agilon® 458 from PPG Industries.

Representative of the aforesaid silica coupler (silica coupling agent) having a moiety reactive with hydroxyl groups on pre-silanized precipitated silica and on precipitated silica and another moiety interactive with said natural rubber or synthetic polyisoprene may be comprised of, for example:

(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an alkoxyorganomercaptosilane, or (C) their combination. Representative of such bis(3-trialkoxysilylalkyl) polysulfide is comprised of bis(3-triethoxysilylpropyl) polysulfide. As indicated, for the pre-silanized precipitated silica, the silica coupler is desirably an alkoxyorganomercaptosilane. For the non-pre-silanized precipitated silica, the silica coupler is desirably comprised of the bis(3-triethoxysilylpropyl) polysulfide.

In one embodiment, the rubber composition is exclusive of addition of silica coupler to the rubber composition (thereby exclusive of silica coupler).

As indicated in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized silica to said precipitated silica is desirably at least 8/1, alternately at least 10/1.

In another embodiment, the rubber composition comprises less than 5 phr of oil. Amongst others, this may help to improve the stiffness of the rubber compound.

In a further embodiment, the rubber composition is essentially free of polyethylene glycol. While this material may be used in some winter tread compounds, it is not desired to have this substance in the present composition, in particular when used in ply coat material. The amount of polyethylene glycol in the composition may be less than 2 phr.

With regard to synthetic polyisoprene and natural rubber, synthetic cis 1,4-polyisoprene and cis 1,4-polyisoprene natural rubber are as such well known to those having skill in the rubber art. Moreover, such polyisoprene may be understood as 1,4-polyisoprene having at least 90 percent cis-content, preferably at least 92 percent cis-content or at least 95 percent cis-content.

In an embodiment, the rubber composition may include oil such as processing oil. Processing oil may be included in the rubber composition as extending oil typically used to extend elastomers. Processing oil may also be included in the rubber composition by addition of the oil directly during rubber compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Commonly employed carbon blacks may be used as a part of conventional filler and/or as material for providing the composition with a black color. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 g/kg to 145 g/kg and DBP number ranging from 34 cm$^3$/100 g to 150 cm$^3$/100 g.

In one embodiment, the rubber composition may contain a conventional sulfur containing organosilicon compound. Examples of suitable sulfur containing organosilicon compounds are of the formula:

$$Z-Alk-S_n-Alk-Z \qquad (I)$$

in which Z is selected from the group consisting of

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

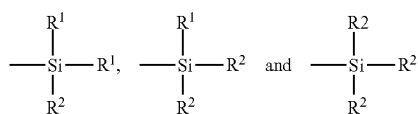

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in United States Patent Publication No. 2003/0130535. In one embodiment, the sulfur containing organosilicon compound is Si-363 from Degussa.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 phr to 5 phr. Typical amounts of fatty acids, if used, which can include stearic acid comprise about 0.5 phr to about 3 phr. Typical amounts of waxes comprise about 1 phr to about 5 phr. Often microcrystalline waxes are used. Typical amounts of peptizers comprise about 0.1 phr to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 phr to about 4 phr, alternatively about 0.8 phr to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. However, preferably this step can be skipped in accordance with an embodiment of the invention as the pre-silanized silica has been pretreated which may make this step dispensable. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another aspect of the invention a tire is provided, comprising the rubber composition in accordance with the invention or one or more of its embodiments.

In an embodiment, the tire comprises a ply, e.g. one or more of a belt ply, a carcass ply, an overlay ply (covering one or more belt plies), and a ply strip (which may be spirally wound in a circumferential direction of the tire). The ply or ply strip comprises a rubber composition coating, e.g. a rubber coating added to a textile or wire material. Such coatings may also be described as layers or sheets of rubber added to both sides of the textile or a plurality of parallelly extending wires, typically in a calender device (e.g. a wire calender or textile calender). The coating comprises or consists of the composition in accordance with the invention or one or more of its embodiments described herein.

In another embodiment, the ply comprises a plurality of essentially parallelly extending metal wires coated with the rubber composition, wherein the plurality of parallelly extending metal wires define a plane of parallelly extending metal wires which is calendered on both sides with the rubber composition.

The tire of the present invention may be a race tire, passenger tire, aircraft tire, agricultural tire, earthmover tire, off-the-road tire, truck tire, and the like. The tire may also be a radial or bias. In particular, the tire may be a pneumatic radial (medium) truck tire. Such a tire will typically be a pneumatic tire which is comprised of a generally toroidal-shaped carcass with an outer circumferential tread, two spaced beads, at least one reinforced ply extending from bead to bead, and sidewalls extending radially from and connecting said tread to said beads, wherein said tread is adapted to be ground-contacting, and wherein the tire further includes a belt ply, a carcass ply, an overlay ply, or a ply strip which is comprised of the ply rubber composition of this invention.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE EMBODIMENTS

Figure 1:
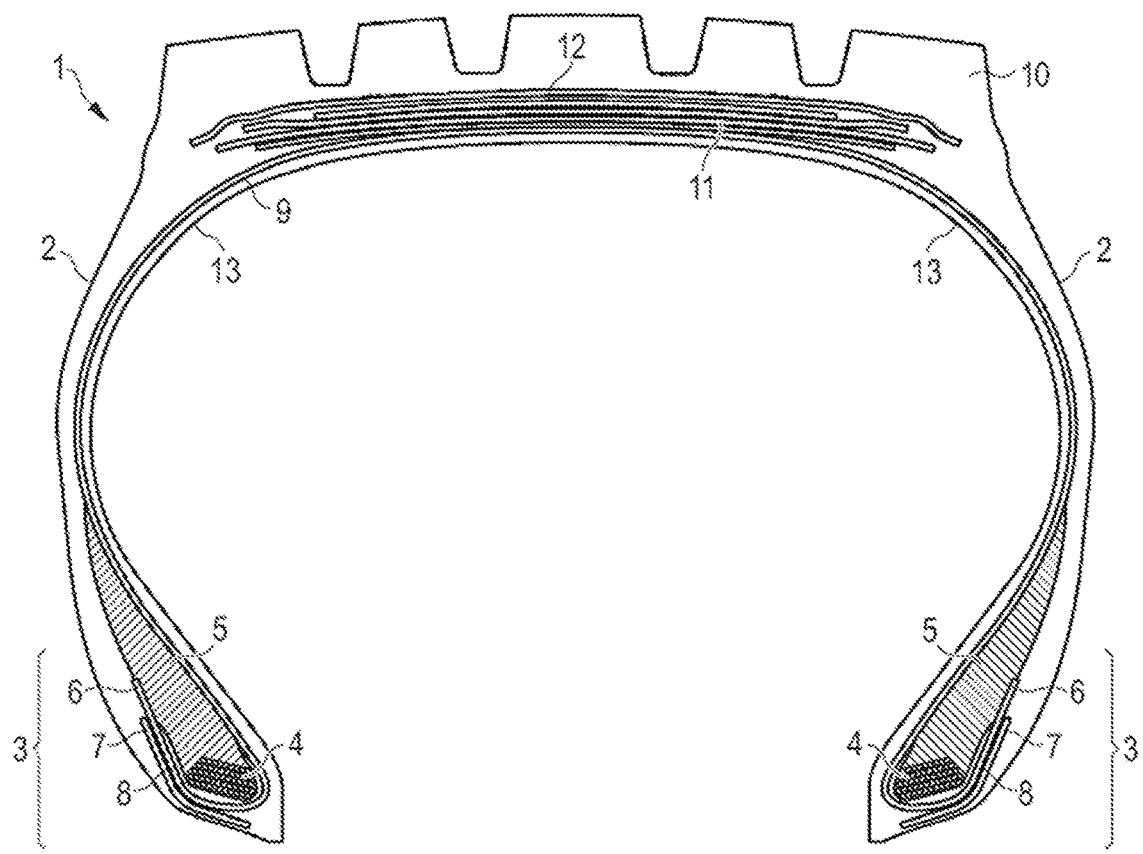
FIG. 1 represents a schematic cross-section of a tire in accordance with an embodiment of the invention.

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. One or more of the carcass ply 9, belt plies 11 and overlay ply 12 comprise a rubber composition in accordance with the invention and may have a plurality of substantially parallel reinforcing members made of a fabric material such as polyester, rayon, or similar suitable organic polymeric compounds or made of metal wire. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The main portion of the tread 10 may be formed of one or more tread compounds, which may be any suitable tread compound or compounds.

While the embodiment of FIG. 1 suggests a plurality of tire components including for instance apexes 5, chippers 7, flippers 8 and overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves.

Figure 2:
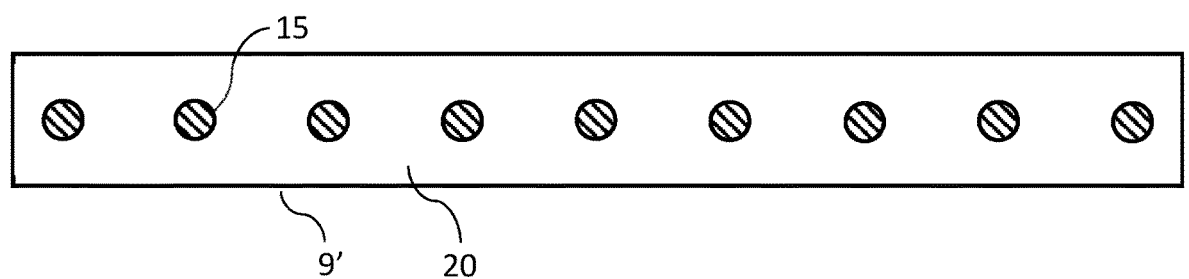
FIG. 2 represents a schematic cross-section of a ply (e.g. a belt, carcass or overlay ply) comprising wires or cords coated with the rubber composition in accordance with an embodiment of the invention.

The schematic cross-section of FIG. 2 shows a ply, e.g. a carcass, belt or overlay ply 9' which comprises a plurality of metal, for instance steel, wires 15 reinforcing the rubber composition material 20. Typically, such a ply is made in a wire calendar in which a plurality of essentially parallel metal wires is coated from both sides with a layer or sheet of rubber composition 20. Such methods are well known to the person skilled in the art of tire building. After curing, the wires 15 are embedded in the rubber composition 20, reinforcing the same.

Metal wires 15 may be coated with brass for better adhesion properties with regards to connection of the wires 15 to the cured rubber composition 20. The wires 15 may also be dipped in dipping solutions or emulsions for better adhesion properties as known in the art. Neither a dip nor a metal coating is shown here in FIG. 2. For the sake of better adhesion of the compound 20 to the metal wire 15, the compound 20 may comprise cobalt salt. Moreover, the compound 20 can comprise zinc oxide which may also improve the adhesion between the metal wire 15 and the cured compound 20.

While the schematic drawing of FIG. 2 indicates nine wires, the number of parallel wires per ply could be different, for instance at least 5 or 10. The invention could also be used in a ply strip comprising the rubber composition, with the strip comprising only between 3 and 6 cords or wires.

A preferred example of a ply coat rubber composition in accordance with the invention is shown in Table 1 in comparison with a Control Sample. The Control Sample comprises highly dispersed silica (HDS) whereas the compound according to the invention comprises pre-silanized precipitated silica. The pre-silanized precipitated silica in the Example has been pre-hydrophobated by the addition of hydrocarbon chains to the surface of the silica and has further been pre-silanized with mercaptosilanes, thereby adding mercaptogroups to the surface of the pre-silanized precipitated silica. However, the present invention shall not be limited to exactly this combination. Further possibilities in accordance with the invention are set out in the appended claims as well as in the summary of the invention.

The Example composition comprises a blend of natural rubber and synthetic polyisoprene rubber and less oil than the Control Sample. The amounts of zinc oxide, cobalt salt and antidegradants are not changed. The amounts of carbon black and (separate) silica coupler are reduced in the Example of the invention while the amount of pre-silanized precipitated silica is significant with 55 phr.

Carbon black is blended in relatively small amounts, basically for providing the tire material with a black color.

TABLE 1

| | Parts by weight (phr) | |
|---|---|---|
| Material | Control | Invention Example |
| Natural Rubber | 100 | 75 |
| Synthetic Polyisoprene | 0 | 25 |
| Oil[1] | 3.5 | 1 |
| Zinc Oxide | 9 | 9 |
| Precipitated HDS Silica[2] | 55 | 0 |
| Pre-Silanized Precipitated Silica[3] | 0 | 55 |
| Silica Coupler[4] | 6 | 3 |
| Carbon Black | 6 | 3 |
| Cobalt Salt | 0.5 | 0.5 |
| Antidegradants | 4.5 | 4.5 |
| Stearic acid | 1 | 0 |
| Accelerator[5] | 2 | 2 |
| Sulfur | 5 | 6 |

[1]Rubber process oil comprised of an TDAE oil
[2]Precipitated silica such as Zeosil 1165MP™ from Solvay
[3]Pre-silanized precipitated silica (CTS) such as Agilon 400™ from PPG Industries as precipitated silica chemically treated with an alkoxyorganomercaptosilane
[4]Silica coupler such as Si266™ and Si69™ from Evonik comprised of bis(3-triethoxysilylpropyl) polysulfide having an average of from about 2 to about 2.6 and from about 3.4 to about 3.8, respectively, connecting sulfur atoms in its polysulfidic bridge
[5]Sulfur cure accelerators such as sulfenamide Table 2 discloses mechanical test results for the Control composition and the Example composition disclosed in Table 1. While the Shore A hardness has decreased at an acceptable degree versus the Control Sample, the Example composition shows a significant improvement in rebound values tested at 23° C. and 100° C. which may likely result in practice in smaller hysteresis and thus reduced rolling resistance. The same is indicated by a significant improvement in the tangent delta measurement. In particular, rebound at 23° C. has improved by about 20% and rebound at 100° C. has improved by about 15%. The tangent delta (tan δ) shows an improvement by more than 30%.

TABLE 2

| Test/Property | Units | Control | Invention Example |
|---|---|---|---|
| Shore A hardness(23° C.)[a] | — | 78.3 | 71 |
| Rebound (23° C.)[b] | % | 50.4 | 61.5 |
| Rebound (100° C.)[b] | % | 69 | 79.8 |
| G' (1%)[c] | MPa | 3.8 | 1.9 |
| G' (10%)[c] | MPa | 2.2 | 1.4 |
| G' (15%)[c] | MPa | 1.8 | 1.2 |
| G' (50%)[c] | MPa | 1.0 | 0.8 |
| Tan delta (10%)[c] | — | 0.15 | 0.10 |

[a]Shore A hardness measured according to ASTM D2240.
[b]Rebound measured on a Zwick Roell 5109 rebound resilience tester according to DIN 53512/ASTM D1054 at given temperature.
[c]Data obtained with an RPA 2000™ Rubber Process Analyzer of Alpha Technologies based on ASTM D5289.

The combination in this example using a significant amount of pre-silanized precipitated silica has resulted in a significant change in the physical properties of the composition, especially with regards to rolling resistance predictors such as tangent delta and rebound values.

If not otherwise indicated herein, amounts of materials are usually expressed in parts of material per 100 parts of rubber by weight (phr).

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims.

In any case the above described embodiments and examples shall not be understood in a limiting sense. In particular, the features of the above embodiments may also be replaced or combined with one another.

The invention claimed is:

1. A ply coat rubber composition, the rubber composition comprising: 60 phr to 100 phr of natural rubber, up to 40 phr of synthetic polyisoprene, 30 phr to 80 phr of pre-silanized precipitated silica, 0.1 phr to 5 phr of a cobalt salt, 0 to 15 phr of carbon black, 0 to 5 phr of a resin, a silica coupling agent, wherein the phr ratio of said pre-silanized precipitated silica to the silica coupling agent is between 5:1 and 30:1, and 0 to 8 phr of oil.

2. The ply rubber composition of claim 1 wherein the natural rubber is present at a level which is within the range of 70 phr to 80 phr, wherein the synthetic polyisoprene is present at a level which is within the range of 20 phr to 30 phr, wherein the pre-silanized precipitated silica is present at a level which is within the range of 50 phr to 60 phr, and wherein the carbon black is present at a level which is within the range of 2 phr to 10 phr.

3. The ply rubber composition of claim 1, wherein the cobalt salt is present at a level which is within the range of 0.2 phr to 2 phr.

4. The ply rubber composition of claim 1 wherein the ply rubber composition is further comprised of 1 phr to 20 phr of zinc oxide and/or 1 phr to 15 phr of sulfur.

5. The ply rubber composition of claim 1 wherein the pre-silanized precipitated silica has a CTAB adsorption surface area which is within the range of 130 m²/g to 210 m²/g.

6. The ply rubber composition of claim 1 wherein said pre-silanized precipitated silica is precipitated silica pre-reacted with a sulfur-containing silane which is comprised of bis(3-triethoxysilylpropyl)polysulfide containing an average of from 2 to 5 connecting sulfur atoms in its polysulfidic bridge, or an alkoxyorganomercaptosilane.

7. The ply rubber composition of claim 1, wherein the surface of said pre-silanized precipitated silica is pre-hydrophobated with a hydrocarbon chain material having at least 4 carbon atoms along its chain.

8. The ply rubber composition of claim 1, wherein the pre-silanized precipitated silica has a hydrocarbon chain material on its surface, and wherein the carbon on the surface of the pre-silanized precipitated silica is present at a level which is within the range of 3 weight percent to 8 weight percent.

9. The ply rubber composition of claim 1 wherein the ply rubber composition contains less than 5 phr of oil and wherein the ply rubber composition is essentially free of polyethylene glycol.

10. A ply rubber composition, the rubber composition comprising: 60 phr to 100 phr of natural rubber, up to 40 phr of synthetic polyisoprene, 30 phr to 80 phr of pre-silanized precipitated silica, 0 to 15 phr of carbon black, 0 to 5 phr of a resin, a silica coupling agent, wherein the phr ratio of said pre-silanized precipitated silica to the silica coupling agent is between 5:1 and 30:1, and 0 to 8 phr of oil.

11. The ply rubber composition of claim 10 wherein the natural rubber is present at a level which is within the range of 70 phr to 80 phr, wherein the synthetic polyisoprene is present at a level which is within the range of 20 phr to 30 phr, wherein the pre-silanized precipitated silica is present at a level which is within the range of 50 phr to 60 phr, and wherein the carbon black is present at a level which is within the range of 2 phr to 10 phr.

12. The ply rubber composition of claim 10 wherein the ply rubber composition is further comprised of 1 phr to 20 phr of zinc oxide and/or 1 phr to 15 phr of sulfur.

13. The ply rubber composition of claim 10 wherein the pre-silanized precipitated silica has a CTAB adsorption surface area which is within the range of 130 m²/g to 210 m²/g.

14. The ply rubber composition of claim 10 wherein said pre-silanized precipitated silica is precipitated silica pre-reacted with a sulfur-containing silane which is comprised of bis(3-triethoxysilylpropyl)polysulfide containing an average of from 2 to 5 connecting sulfur atoms in its polysulfidic bridge, or an alkoxyorganomercaptosilane.

15. The ply rubber composition of claim 10 wherein the surface of said pre-silanized precipitated silica is pre-hydrophobated with a hydrocarbon chain material having at least 4 carbon atoms along its chain.

16. The ply rubber composition of claim 10 wherein the pre-silanized precipitated silica has a hydrocarbon chain material on its surface, and wherein the carbon on the surface of the pre-silanized precipitated silica is present at a level which is within the range of 3 weight percent to 8 weight percent.

17. The ply rubber composition of claim 10 wherein the ply rubber composition contains less than 5 phr of oil and wherein the ply rubber composition is essentially free of polyethylene glycol.

18. A tire having at least one ply selected from the group consisting of a belt ply, a carcass ply, an overlay ply, and a ply strip, wherein at least one of the plies or the ply strip of the tire comprises a rubber composition comprising: from 60 phr to 100 phr of natural rubber, from 0 phr to 40 phr of synthetic polyisoprene, from 30 phr to 80 phr of pre-silanized precipitated silica, optionally from 0.1 to 5 phr of a cobalt salt, from 0 phr to 15 phr of carbon black, from 0 phr to 5 phr of resin, a silica coupling agent, wherein the phr ratio of said pre-silanized precipitated silica to the silica coupling agent is between 5:1 and 30:1, and from 0 phr to 8 phr of oil.

19. The tire of claim 18 wherein the ply or the ply strip comprises a textile which is calendered on both sides with the rubber composition.

20. The tire of claim 18 wherein the ply or the ply strip is comprised of a plurality of essentially parallelly extending metal wires which are coated with the rubber composition, and wherein optionally the plurality of parallelly extending metal wires define a plane of parallelly extending metal wires which are calendered on both sides with the rubber composition.

* * * * *